(12) United States Patent
Chase

(10) Patent No.: US 9,686,571 B2
(45) Date of Patent: Jun. 20, 2017

(54) TECHNIQUES TO MANAGE A NETWORK TELEVISION SCHEDULE

(71) Applicant: CBS INTERACTIVE INC., San Francisco, CA (US)

(72) Inventor: James M. Chase, Mt. Laurel, NJ (US)

(73) Assignee: CBS Interactive Inc., New York, NY (US)

( * ) Notice: Subject to any disclaimer, the term of this patent is extended or adjusted under 35 U.S.C. 154(b) by 14 days.

(21) Appl. No.: 13/681,354

(22) Filed: Nov. 19, 2012

(65) Prior Publication Data

US 2014/0143813 A1   May 22, 2014

(51) Int. Cl.
*H04N 21/234* (2011.01)
*H04N 21/25* (2011.01)
*H04N 21/435* (2011.01)
*H04N 21/44* (2011.01)
*H04N 21/458* (2011.01)
*H04N 21/462* (2011.01)
*H04N 21/262* (2011.01)

(52) U.S. Cl.
CPC ..... *H04N 21/23424* (2013.01); *H04N 21/262* (2013.01)

(58) Field of Classification Search
CPC .......... H04N 21/23424; H04N 21/258; H04N 21/25891; H04N 21/4532
See application file for complete search history.

(56) References Cited

U.S. PATENT DOCUMENTS

| | | | |
|---|---|---|---|
| 6,698,020 B1* | 2/2004 | Zigmond | H04N 5/44513 348/E5.102 |
| 7,028,327 B1* | 4/2006 | Dougherty | H04N 7/17318 348/E7.071 |
| 2001/0025301 A1* | 9/2001 | Anderson | H04L 12/2856 709/207 |
| 2003/0043789 A1* | 3/2003 | Okajima et al. | 370/360 |
| 2004/0128682 A1* | 7/2004 | Liga | H04N 5/445 725/35 |
| 2005/0251820 A1* | 11/2005 | Stefanik | H04N 5/445 725/34 |
| 2008/0010342 A1* | 1/2008 | Gebhardt et al. | 709/204 |
| 2011/0093569 A1* | 4/2011 | Yamagishi | H04N 7/17336 709/219 |

* cited by examiner

*Primary Examiner* — Brian T Pendleton
*Assistant Examiner* — Jean D Saint Cyr

(57) ABSTRACT

Techniques to selectively provide a video feed to broadcasting equipment are disclosed. A master control switcher may receive video feeds from video servers containing video content. The master control switcher may select one of the video feeds to output. At least one localized switcher may also receive video feeds from the video servers and select one of the video feeds to output. One of the video feeds supplied to the localized switcher(s) is the output from the master control switcher. An air server may receive video feeds from the master control switcher and the at least one localized switcher and out put the video feeds to separate broadcasting equipment. The video feeds may be arranged to reflect a schedule of programming for a local television station. Other embodiments are described and claimed.

15 Claims, 8 Drawing Sheets

Schedule Switching Screen

| 610 | 620 | 630 | 640 |
|---|---|---|---|
| Service Provider | Source | Content | Time |
| ALL | VS1 | Promo - Mentalist | 20:60:02 |
| ALL | VS1 | Show – Big Bang Theory | 20:60:62 |
| ALL | VS1 | Spot - Tide | 20:69:06 |
| OTA Satellite | VS1 | Spot – Cable (1) | 20:40:06 |
| Cable | VS6 | Spot – Cable (2) | 20:40:06 |
| ALL | VS1 | Spot – Bud Light | 20:40:66 |
| ALL | VS1 | Show – Big Bang Theory | 20:41:66 |
| ALL | VS1 | Spot - Ford | 20:51:15 |
| ALL | VS1 | Spot - Puffs | 20:52:15 |
| ALL | VS1 | Promo - CSI | 20:52:45 |
| ALL | VS1 | Show – Big Bang Theory | 20:56:15 |
| ALL | VS1 | Spot – Campaign Ad | 20:58:55 |
| ALL | VS1 | Promo - Survivor | 20:59:55 |
| ALL | VS1 | Show - Survivor | 21:00:25 |

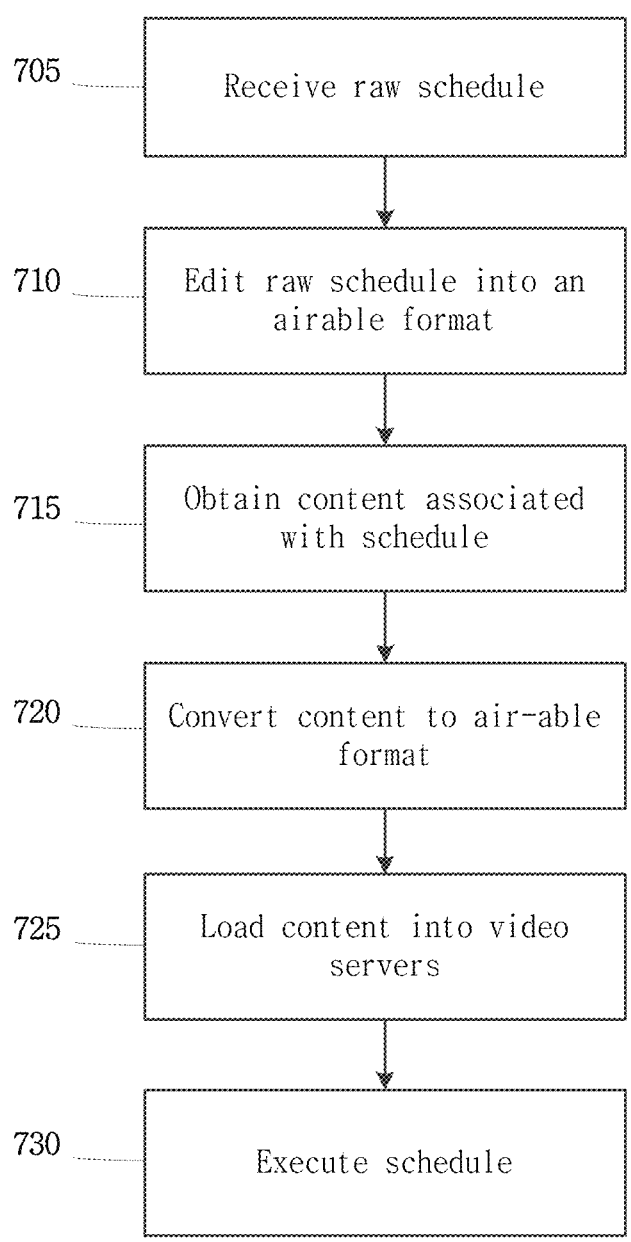

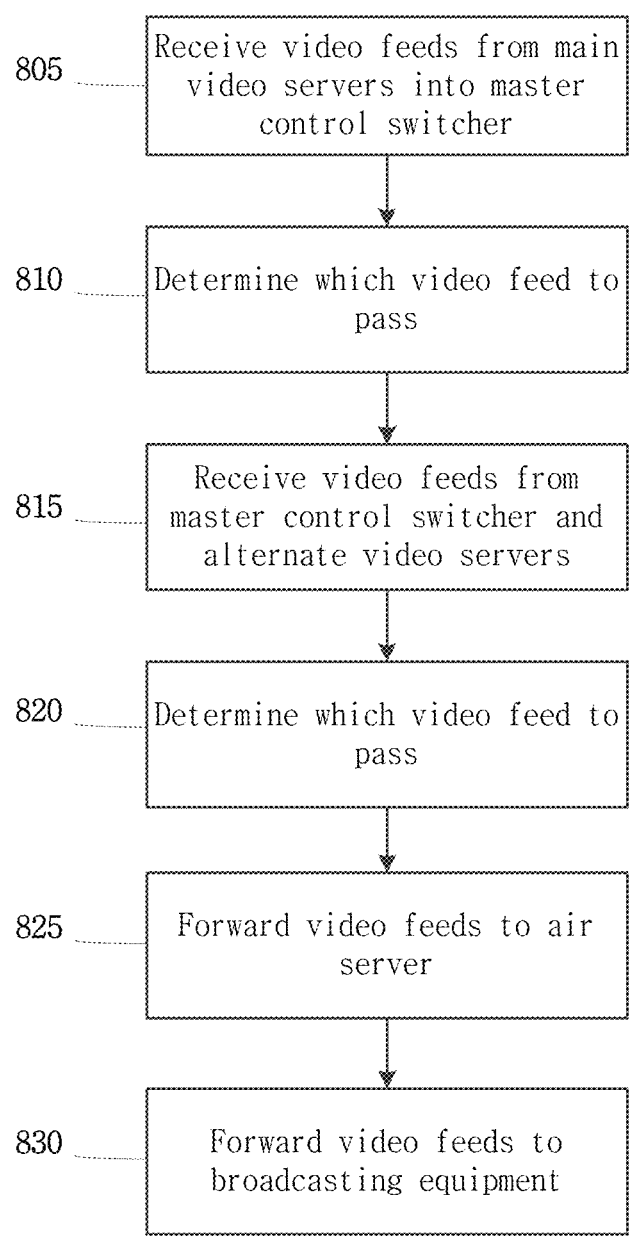

TECHNIQUES TO MANAGE A NETWORK TELEVISION SCHEDULE

BACKGROUND

In the early 1970's network broadcasters saw a need for their local television stations to have an automated master control system that worked hand in hand with a traffic and sales system. The initial goal was to create sales orders and a schedule that could then be formatted into a file that could be loaded into a computer system. This computer would then control the systems used in the master control operation. Finally the completed log with accurately logged air times and log discrepancies would be returned to the sales system allowing for an automated billing to clients. That traffic and sales system originally ran on a mainframe computer system. The automation system ran on a Digital Equipment Corporation (DEC) PDP11 computer. These two systems would later become the Integrated Broadcast System (IBS) and Real Time (RT) respectively.

Network broadcasters such as CBS also own and operate many local affiliate stations throughout the country. Each of these local stations broadcasts the network master schedule. The master schedule is a detailed down to the second account of that day's programming. Programming may include television programs and advertisement spots herein after referred to as programs and spots.

Today, consumers may obtain television service from one of many different alternatives. In addition to over-the-air (OTA) reception of locally broadcast television signals, consumers may receive television programming through service providers such as cable television service providers, satellite television service providers, and television over telephone line service providers. A network feeds its broadcast schedule and content to each of its local stations (e.g., affiliates). The local stations must then insert the various spots into the schedule along with the programs and distribute a broadcast signal to each of the television service providers as well as broadcast the signal over-the-air.

The same spots are inserted into the broadcast signal before it is disseminated to the various television service providers. If one of the service providers purchases an advertising spot, it will air regardless of the television service provider. Thus, a cable operator may air a spot intended to attract new customers. The spot will air to every consumer regardless of their television service provider. This is fine for all but the cable operators own subscribers since they already subscribe. The spot for the cable operator's own subscribers is essentially wasted since they are already subscribed to the service. If the cable operator has a market share of 35% for that local market, the spot is only 65% effective. There are currently no means for providing a different spot to the cable operators own subscribers.

SUMMARY

Various embodiments are generally directed to techniques to selectively provide a video feed to broadcasting equipment. A master control switcher may receive video feeds from video servers containing video content. The master control switcher may select one of the video feeds to output. At least one localized switcher may also receive video feeds from the video servers and select one of the video feeds to output. One of the video feeds supplied to the localized switcher(s) is the output from the master control switcher. An air server may receive video feeds from the master control switcher and the at least one localized switcher and out put the video feeds to separate broadcasting equipment. The video feeds may be arranged to reflect a schedule of programming for a local television station.

Other embodiments include a traffic master (TM) server may execute software applications operative to receive schedule data indicative of programming to air on the local television station and edit the schedule data to create an air-able schedule. In addition, an inventory management server (IMS) server may execute software applications operative to locate video content associated with the programming, convert the video content to a specific format, and load the converted video content into the video servers.

Certain illustrative aspects are described herein in connection with the following description and the annexed drawings. These aspects may be indicative of the various ways in which the principles disclosed herein can be practiced. In addition, these aspects and any equivalents are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a screenshot of a schedule.

FIG. 7 illustrates an embodiment of a logic flow.

FIG. 8 illustrates an embodiment of a logic flow.

DETAILED DESCRIPTION

Figure 1:
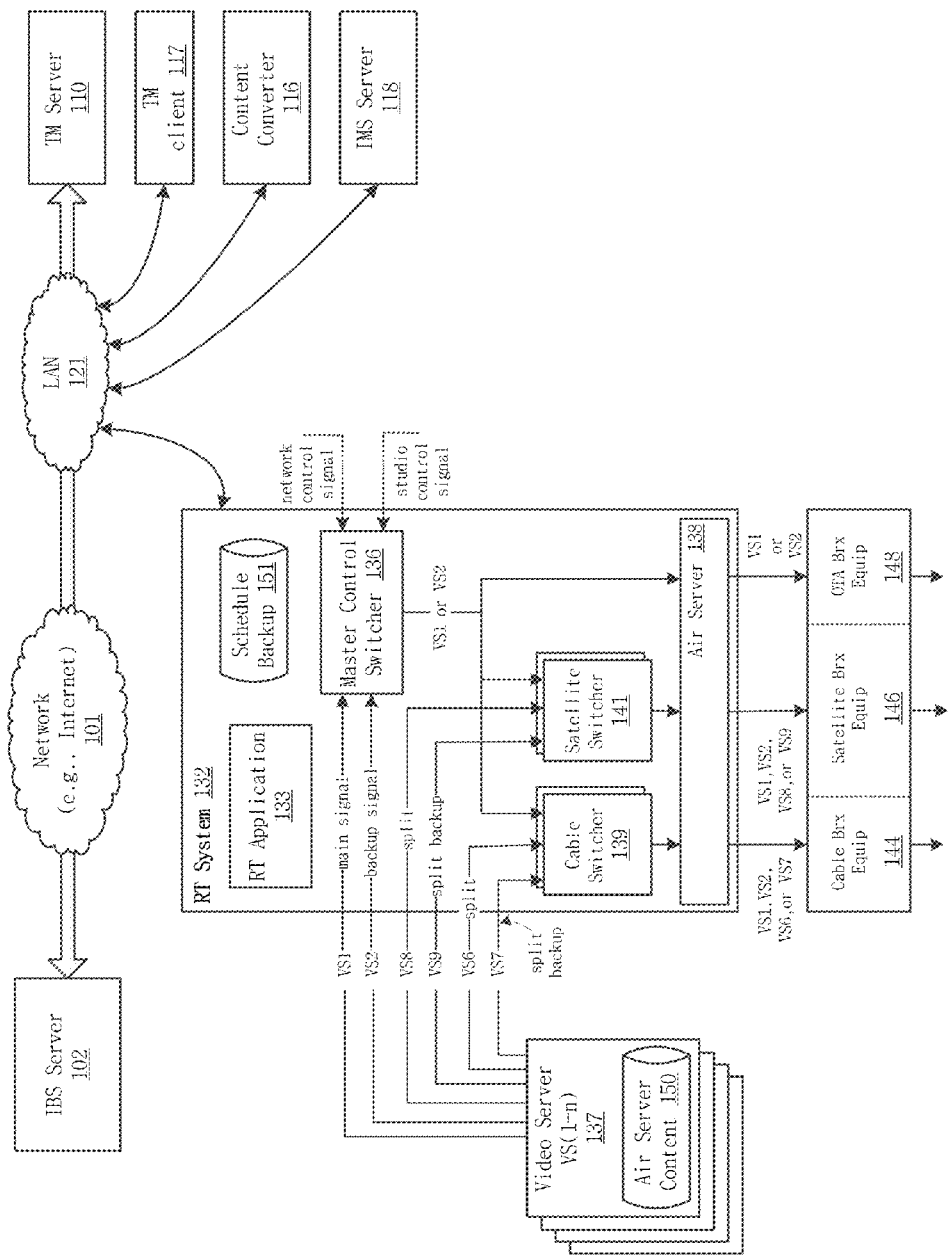
FIG. 1 illustrates a block diagram of an embodiment of a traffic management/real-time (TM/RT) platform system.

The integrated broadcast system (IBS) is an updated traffic and sales system intended to create sales orders and a network broadcast schedule that may then be formatted into a file that could be loaded into a computer system. Along with tools designed for sales tracking, inventory control, rate card, program formatting and more, IBS affords account executives, traffic operations managers, sales assistants and others a windows based program designed to easily complete the tasks necessary for creating network broadcast schedules for a master control automation system.

Another component, the Traffic Master system (TM), is a menu driven application residing on a TM server used to create, edit and modify a network broadcast schedule of programs and spots. Programs may include, but are not limited to, scripted television shows, unscripted television shows, sporting events, newscasts, and movies among other video content. Spots may include, but are not limited to, advertisements, network promotions promoting programs, and public service announcements.

TM is a server application that affords multiple users access to these functions at the same time. TM is not limited to these functions and additionally provides a platform to generate reports, track schedule, log and inventory history. TM is designed to accept a completed network broadcast schedule from the IBS system and convert it into a format that allows a user to make rapid changes at the local station level. Users with access to TM can make these changes directly from their desktop computer (e.g., TM client machine) and do not have to call or go to master control. Once the schedule has been aired through the local station's automation system (RT), TM has a utility that can send a log back to IBS to begin an automated billing process. Log variances are taken into account during this process and prevent unwanted billing from occurring.

The local station's automation system (RT) is a comprehensive master control automation system. RT controls a master control switcher and associated television equipment in real time. Though on-air changes are normally made in advance, the master control operator is in no way limited or prevented from making direct manual interventions if the need arises.

The RT program runs on an RT server computer residing in master control. Through a connection to the facilities local area computer network (LAN), RT is able to access schedule files and databases needed for air operations. In addition RT has the ability to copy to an internal memory storage component of this server these schedule files and databases. In the event of a LAN failure the master control operator may recall the backed up schedule and maintain system integrity.

In order for the LAN facilities (which include RT and TM) to operate with minimum intrusion from other LAN traffic, it must be protected using its own isolated 100 mbit switch (not a hub). The LAN is designed as a self-contained unit. Normally the LAN provides access to authorized users outside the technical area such as traffic, creative services, public affairs and possibly others.

Thus, the TM/RT platform is an automation system utilizing a common global platform that is used to schedule, execute, and log the program and commercial line-up of owned & operated local stations. The TM portion is a menu driven application used to create, edit, and modify the broadcast schedule. The RT portion is a comprehensive master control automation system that controls the master control switcher and associated television equipment in real-time. RT even permits manual intervention when warranted. The RT application resides within master control and has access to schedule files and databases needed for air operations.

Various embodiments described herein may be implemented as part of a network television schedule management system that permits separate spots to air for separate television service providers. The main signal coming from a local station may be provided to multiple distribution entities (e.g., television service providers such as, Comcast, Time Warner, Dish, Directv, OTA, U-verse, Verizon FIOS, etc.). The main signal includes the programming and any non-programming spots based on the master schedule developed by the TM system and executed by the RT system. That means every spot is the same for every television service provider. Sometimes a television service provider may wish to run a different spot than what is in the master schedule. Heretofore, the only solution was for the requesting entity to have their own parallel RT system executing. The embodiments described herein present an alternative to running parallel RT systems.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram of an embodiment of a traffic management/real-time (TM/RT) platform system 100. The TM/RT system 100 generally resides within a local television station and is communicable with certain components under control of a broadcast network entity such as an integrated broadcast system (IBS) server 102. The IBS server 102 may communicate with a traffic manager (TM) server 110 to provide raw master schedule data to the local station schedule editor over a network 101 such as, for instance, the Internet as well as a local area network (LAN) 121 that services the local television station. The TM server 110 may be accessible by one or more TM client computers 117. Users of the TM client computers 117 may edit the raw schedule data as well as the finished schedule via applications executing on the TM server 110. The TM/RT system 100 further includes an inventory management system (IMS) server 118 to assist in locating and organizing content (e.g., programs and spots) associated with the local television schedule. A content converter 116 may be used to ensure that all content is converted into a uniform specified format suitable to air.

Figure 2:
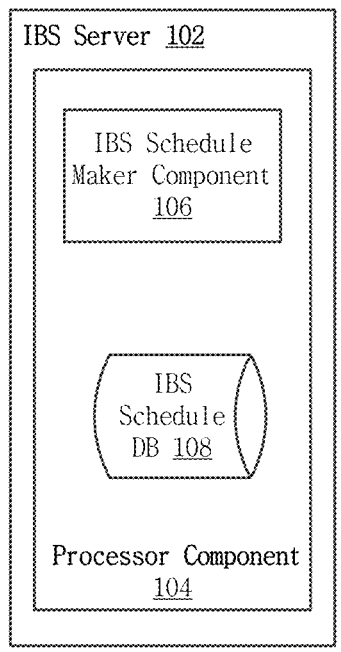
FIG. 2 illustrates a block diagram of an embodiment of an integrated broadcast system (IBS) server.

FIG. 2 illustrates a block diagram of an embodiment of an integrated broadcast system (IBS) server. On the broadcast network side, an integrated broadcast system (IBS) is a menu driven application residing on an IBS server 102 under control of a processor 104. The IBS server 102 may host an IBS schedule maker component 106 and an IBS schedule database 108. The IBS schedule maker component 106 facilitates the creation of a master network schedule of programs and spots that accounts for every second of a day. The schedule may be created months in advance and is not an air-able schedule. The IBS schedule database 108 may then store the master schedules for many months worth of days to cover many local television stations. The embodiments are not limited to this example.

Figure 3:
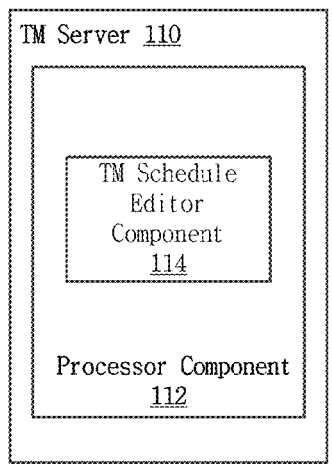
FIG. 3 illustrates a block diagram of an embodiment of a traffic manager (TM) server.

FIG. 3 illustrates a block diagram of an embodiment of a TM server 110. The TM/RT system 100 utilizes the TM server 110 to receive master schedule data of programs and spots from the IBS server 102. The IBS data is typically received 1-2 days prior to air. A TM schedule editor component 114 operative on a processor component 112 may then convert the master schedule to an air-able schedule. The air-able schedule may then be accessed by multiple users over LAN 121 via a TM client computer 117. Users may make rapid changes to the schedule at the local station level via one or more TM client computers 117 without having to involve master control.

Referring back to FIG. 1, in between the time that a master schedule is imported into the TM server 110 and the time it actually airs, the content associated with the programs and spots on the schedule must be loaded into the an server 138 under control of the RT system 132. To assist in this process, the IMS server 118 may be operative to load program and spot content into multiple video servers 137. The multiple video servers 137 may be associated with different television service providers. Each video server 137 may contain an air-able video feed that may be cued up by the RT system 132 to an air server 138. The air server 138 may also include switching components for each of the television service providers. For example, there may be a cable switcher 139 and a satellite switcher 141. The embodiments are not limited to the two generic switchers that have been illustrated. There may be a switcher for each of the television service providers including one or more cable operators, one or more satellite operators, one or more television over telephone line service providers, etc.

The switching components 139, 141 may receive multiple video signals from multiple video servers and choose from among which to pass through to the actual broadcast equipment for that particular television service provider. This process is more fully described with reference to FIG. 5.

Figure 4:
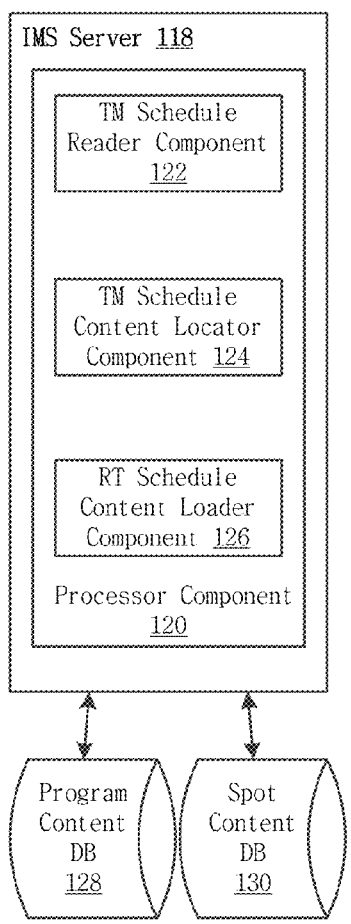
FIG. 4 illustrates a block diagram of an embodiment of an inventory management system (IMS) server.

FIG. 4 illustrates a block diagram of an embodiment of an IMS server 118. The IMS server 118 may include a TM schedule reader component 122, a TM schedule content locator component 124, and an RT schedule content loader component 126. Each of the TM schedule reader component 122, TM schedule content locator component 124, and RT schedule content loader component 126 may be operative on a processor component 120. The TM schedule reader component 122 may be operative to read and parse the schedule created by the TM schedule editor component 114 to identify each of the programs and spots (e.g., content) listed on the schedule. Each piece of content (e.g., program or spot) is indicative of a video file. The TM schedule content locator component 124 may then search for and locate each piece of content identified by the TM schedule reader component 122. The TM schedule content locator component 124 may have access to a program content repository 128 and a spot content repository 130. The program content repository 128 may store formatted video files of program content while the spot content repository 130 may store formatted video files of spot content.

Video content may be generated in any number of file formats. However, all content must be converted to a single format for air. The format must be interpretable by the broadcast equipment. Referring back to FIG. 1, the TM/RT system 100 utilizes the content converter 116 to ensure that all files are in the same specified format. The content converter 116 may receive a video file in one of many file formats and convert it to the specified format of the TM/RT system 100 and place it in the program content repository 128 or the spot content repository 130 depending on whether the content is for a program or a spot. The RT schedule content loader component 126 may then copy each piece of content located by the TM schedule content locator component 124 from its current location to one or more air server content repositories 150.

At this point, the TM portion of the TM/RT system 100 has completed its job by creating an air-able schedule and placing the content associated with that schedule into the RT portion of the TM/RT system 100. Changes may still be made via the one or more TM client computers 117 should any be warranted.

When the time comes to air the schedule, the RT system 132 may be automatically set up to do so. The RT portion of the TM/RT system 100 may be a comprehensive master control automation system that controls a master control switcher 136 and associated television broadcast equipment 144, 146, 148 in real-time via an RT application 133. The RT system 132 may even permit manual intervention should such intervention be warranted. The RT system 132 may have access to schedule files and storage components that are needed for air operations.

The RT system 132 may include a schedule backup memory component 151. The schedule backup memory component 151 may store the most recent schedule such that in the event of a LAN 121 failure, an RT system 132 operator may use the RT application 133 to recall the backed up schedule and maintain system integrity.

The RT system 132 may also include a master control switcher 136. The master control switcher 136 may receive video feeds from a video server 137 over video server channels (e.g., VS1, VS2). The video feeds include the programs and spots in the properly scheduled order. Depending on the level of redundancy, the master control switcher may receive video feeds from more than two video server channels. For the sake of illustration, two video server channels (VS1 and VS2) have been shown. The first, VS1, is indicative of the main or primary video server channel to be aired. The second, VS2, is a backup to the first in case a problem arises with the first video server. Typically, the master control switcher 136 will select the main signal (VS1) to be aired. The main signal will then be supplied to the air server 138 for broadcast to each of the distributing entities (e.g., cable operators, satellite operators, OTA, etc.).

The RT application 133 may perform other functions as well. For example, the RT application 133 may continually check each defined video server 137 to determine whether the content exists in that server. The content may be arranged in a stack according to its position in the schedule. The RT application 133 may begin at the top of the stack and issue a query to each video server 137 to determine if the current event in the stack is present. The RT application waits for a response from each video server 137 before moving to the next event in the stack. This continues at a rate of approximately 1-2 events per second until the stack has been exhausted at which point the process repeats from the top of the stack. If an event has been deleted from a video server 137, the RT application 133 may warn an operator within a few seconds.

The RT application 133 may also determine if a video server 137 is non-responsive. Using the queries described above, the RT application will implement a timeout function that will return a non-acknowledgement response to the RT application if no response to the video server queries is received. After a user-specified number of non-acknowledgment response are received, the RT application 133 may place the non-responding video server 137 off-line and notify an operator that a video server 137 has been taken off-line. In such a case, the RT application can switch to a functioning video server 137 to maintain system integrity.

The air server 138 is typically operative to air the video feed coming from the master control switcher 136 and send it to each of the distributing entities broadcasting equipment 144, 146, 148. In this embodiment a cable operator, a satellite operator, and an over-the-air (OTA) distribution method are shown. It should be understood that there may be more or fewer television service providers associated with the local television station. The embodiments are not limited to this example.

As will be described in greater detail below, the air server 138 may also receive video feeds from individual switchers associated with each of the television service providers shown. Thus, a cable switcher 139 and a satellite switcher 141 are shown. The cable switcher 139 may receive a signal from the master control switcher 136 as well as one or more video feeds from video servers 137 specific to that cable operator. Similarly, the satellite switcher 141 may receive a signal from the master control switcher 136 as well as one or more video feeds from video servers 137 specific to that satellite operator. The local switchers facilitate a break away capability that allows insertion of alternative spots for different television service providers when desired.

As previously discussed, the same spots are inserted into the broadcast signal before it is disseminated to the various distribution entities (e.g., television service providers). If one of the service providers purchases an advertising spot, it will air regardless of the television service provider. Thus, a cable operator may air a spot intended to attract new customers. The spot will air to every consumer regardless of their television service provider. This is fine for all but the cable operators own subscribers since they already subscribe.

Figure 5:
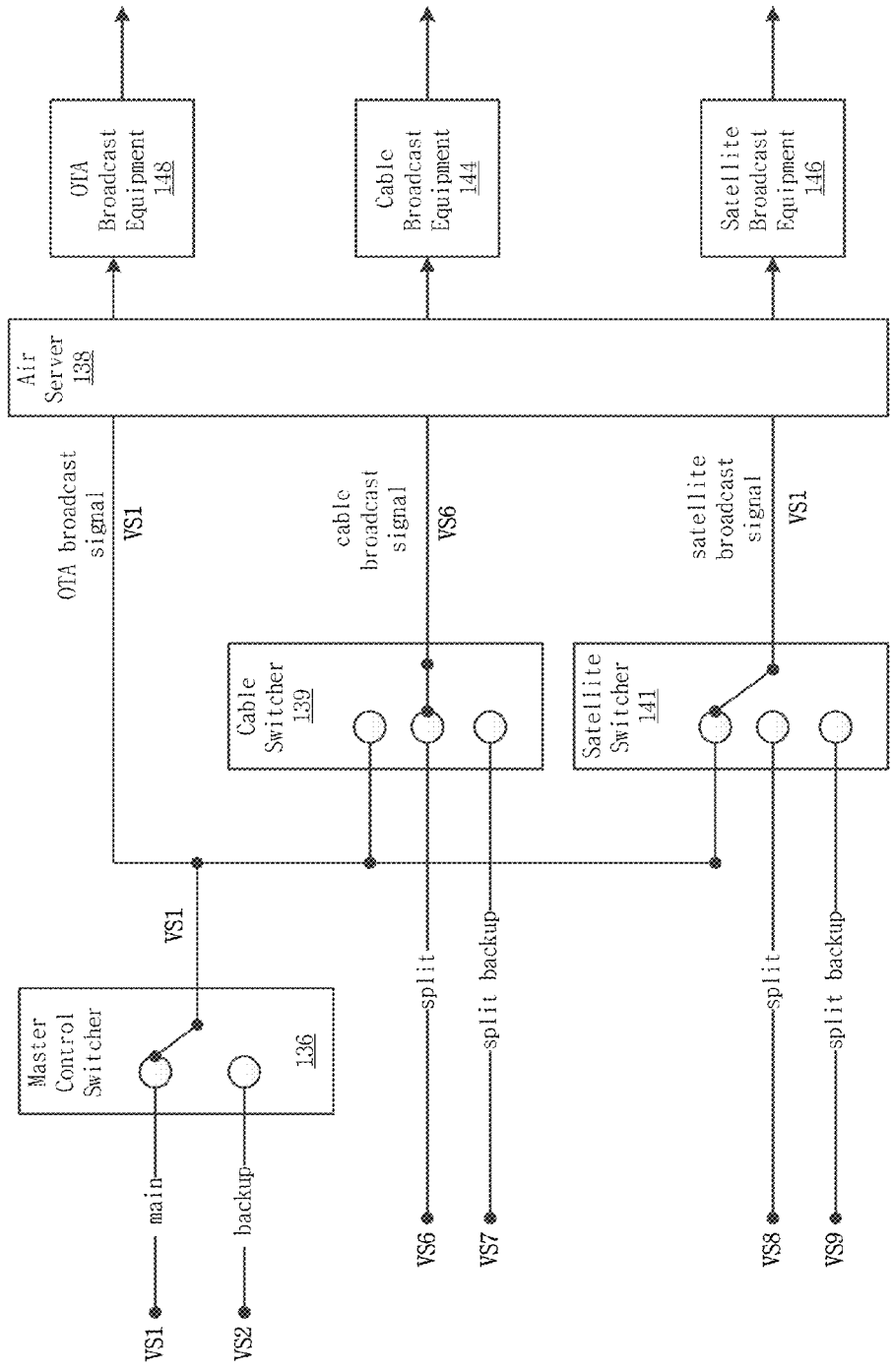
FIG. 5 illustrates a block diagram of an embodiment for switching among video feeds to be broadcast.

FIG. 5 illustrates a block diagram 500 of an embodiment for switching among video signals to be broadcast. The air server 138 may be operative to receive, process and deliver a broadcast signal to broadcast equipment for one or more service providers. In this example, the service providers may include the local station over-the-air (OTA) broadcast equipment 148, cable broadcast equipment 144, and satellite broadcast equipment 146. The air server 138 typically receives the broadcast signal from the master control switcher 136 and distributes it to the broadcast equipment 144, 146, 148 for each of the service providers. The master control switcher 136 may receive multiple broadcast signals from multiple video servers depending on the redundancy scheme implemented by the local station. In this particular example, two video servers feed the master control switcher 136, the first indicative of a main or primary broadcast signal (VS1) and the second indicative of a backup broadcast signal (VS2) that is identical to the main broadcast signal should the primary server malfunction for any reason.

In the embodiment described herein, the air server 138 may also receive individualized broadcast signals on behalf of each of the service providers via the implementation of individual switchers (e.g., cable switcher 139 and satellite switcher 141). The individual switchers 139, 141 each receive a broadcast signal (e.g., VS1 or VS2) from the master control switcher 136. In this example, the master control switcher is switched to pass the VS1 broadcast signal indicating that the main server is functioning properly. The local station may have implemented several other video servers, some associated with specific television service providers. For example, two video servers may be associated with a cable television service provider and two may be associated with a satellite television service provider. The local station may service multiple television service providers each competing for viewers.

The local television station may have set up one or more separate video servers for one or more of the television service providers. This may be done to provide the ability to break away from the main signal and send a different broadcast signal from that issued by the master control switcher 136 for a specific television service provider. For instance, in certain situations, a cable service provider may ask the local station to substitute one spot for another spot provided the spots are of the exact same duration. To implement such a system, the local station allocates a local switcher 139, 141 downstream of the master control switcher 136 for each television service provider.

For example, the cable switcher 139 may switch among three signals from three different video servers. The three signals include the signal coming from the master control switcher 136, VS1 in this instance, and a split signal VS6 from another video server and a split backup signal VS7 from yet another video server. The split signal is labeled to indicate that its content is different from that of VS1 coming from the master control switcher 136. The split backup signal VS7 is indicative of a redundant signal for VS6 when necessary.

The satellite switcher 141 is shown similar to the cable switcher 139. The difference is that the satellite switcher 141 is currently switched to pass the signal VS1 from the master control switcher 136. Thus, at this instant, the air server 138 may forward the main broadcast signal VS1 coming from the master control switcher 136 to the OTA broadcast equipment 148 and satellite broadcast equipment 146. However, the air server 138 may forward a split signal VS6 to the cable broadcast equipment 144 based on the schedule as implemented by the TM portion of the system.

FIG. 6 illustrates a screenshot of a schedule to be implemented by the RT system 132. The visual representation of the schedule may include columns for service provider 610, source 620, content 630, and time 640. The schedule is essentially a chronological table that accounts for programming for every second of the day. In this example, the time between 8:30 PM and 9:00 PM is illustrated. Each time segment under the time column 640 is indicative of a start time for a piece of content from the content column 630. The source column 620 indicates to the RT system 132 which video server should be used to play the content. The service provider column 610 indicates to which service provider the content should be forwarded.

In this example, the schedule is picked up at time 20:30:02 (e.g., 8:32:02 PM) with a promotional spot for an upcoming episode of the TV show "Mentalist". The spot comes from video server 1 and is sent to the broadcast equipment for all of the service providers. This is typical in that each service provider broadcasts the same signal from the local television station. This pattern continues for the schedule illustrated in FIG. 6 until the shaded areas at 20:40:03. At this point, a spot (Cable 1) for a cable television service provider is scheduled to air. This spot may include content presenting viewers the opportunity to get cable television service at a discount rate. The Cable 1 spot is intended to be broadcast to viewers that receive television service over-the-air or via satellite but not to viewers that already receive television service from this cable television service provider because these viewers already subscribe to the cable television service. Thus, the cable television service provider would like to send a substitute spot referred to as a split to its own subscribers. The split spot may include content to advertise to existing subscribers in an attempt to get them to purchase additional services. Assume the cable television service provider has a 65% market share of all television viewers. Thus, the cable provider obtains more value for the purchased advertising spot since it is reaching 100% of viewers with a meaningful spot as opposed to 65% under the previous model. As indicated in the shaded areas, the RT system 132 in reading the schedule causes the master control switcher 136 and the satellite switcher 141 to cue VS1 for the OTA broadcast equipment 148 and satellite broadcasting equipment 146. However, the RT system 132 causes the cable switcher 139 to cue VS6 for the cable broadcast equipment 144. At the conclusion of the split spot, the schedule resumes by broadcasting the main signal VS1 from the master control switcher 136 to all service providers 610.

The split signal may be useful when a service provider purchases an ad spot and wishes to send a different spot to its own subscribers than that of other television service providers. This maximizes the ad spot purchase. The original spot and the split spot must be of the exact same length so as not to disrupt the schedule.

In another example, the television station may sell spots such that they are divided among various television providers. For example, an advertiser may only be interested in reaching satellite television subscribers based on a demographic study or a particular product/service offering. The local television station may sell a spot to be aired only by satellite television service providers while selling another spot of the exact same length to another advertiser for the remaining non-satellite television service providers. The spots may be discounted in price since they will not reach all television viewers.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates one embodiment of a logic flow 700. The logic flow 700 may be representative of some or all of the operations executed by one or more embodiments described herein.

In the illustrated embodiment shown in FIG. 7, the logic flow 700 may receive a raw schedule at block 705. For example, the IBS schedule maker component 106 facilitates the creation of a master network schedule that accounts for every second of a day. The schedule may be created months in advance and is not an air-able schedule. The IBS schedule database 108 may then store the master schedules for many months worth of days. The TM/RT system 100 may include a TM server 110 that can receive master schedule data from the IBS server 102. The IBS data may be typically received 1-2 days prior to air. The embodiments are not limited to these examples.

In the illustrated embodiment shown in FIG. 7, the logic flow 700 may edit the raw schedule into an air-able format at block 710. For example, the TM schedule editor component 114 operative on processor component 112 may then convert the master schedule to an air-able schedule. The air-able schedule may then be accessed by multiple users over a local area network (LAN) 121 via a TM client computer 117. Users may make rapid changes to the schedule at the local station level via one or more TM client computers 117 without having to involve master control. The embodiments are not limited to these examples.

In the illustrated embodiment shown in FIG. 7, the logic flow 700 may obtain content associated with the air-able schedule at block 715. For example, the TM schedule reader component 122 may be operative to read and parse the schedule created by the TM schedule editor component 114 to identify each of the programs and spots (e.g., content) listed on the schedule. Each piece of content (e.g., program or spot) is indicative of a video file. The TM schedule content locator component 124 may then search for and locate each piece of content identified by the TM schedule reader component 122. The TM schedule content locator component 124 may have access to a program content repository 128 and a spot content repository 130. The program content repository 128 may store formatted video files of program content while the spot content repository 130 may store formatted video files of spot content. The embodiments are not limited to these examples.

In the illustrated embodiment shown in FIG. 7, the logic flow 700 may convert content to an air-able format at block 720. For example, video content may be generated in any number of file formats. However, all content must be converted to a single format for air. The format must be interpretable by the broadcast equipment. The TM/RT system 100 may utilize a content converter 116 to ensure that all files are in the same specified format. The content converter 116 may receive a video file in one of many file formats and convert it to the specified format of the TM/RT system 100 and place it in the program content repository 128 or the spot content repository 130 depending on whether the content is for a program or a spot. The embodiments are not limited to these examples.

In the illustrated embodiment shown in FIG. 7, the logic flow 700 may load content into video servers at block 725. For example, the inventory management system (IMS) server 118 may be operative to load program and spot content into multiple video servers 137. The multiple video servers 137 may be associated with different television service providers. The RT schedule content loader component 126 may copy each piece of content located by the TM schedule content locator component 124 from its current location to one or more air server content repositories 150 associated with a video server 137. Each video server 137 may contain an air-able video feed that may be cued up by the RT system 132 to an air server 138. The embodiments are not limited to these examples.

In the illustrated embodiment shown in FIG. 7, the logic flow 700 may execute the schedule at block 725. For example, the RT system 132 may be automatically set up to execute the schedule. The RT portion of the TM/RT system 100 may be a comprehensive master control automation system that controls a master control switcher 136 and associated television broadcast equipment 144, 146, 148 in real-time via an RT application 133. The RT system 132 may have access to schedule files and storage components that are needed for air operations. The embodiments are not limited to these examples.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may receive video feeds from video servers into a master control switcher 136 at block 805. For example, the master control switcher 136 may receive multiple broadcast signals from multiple video servers depending on the redundancy scheme implemented by the local station. In this particular example, two video servers feed the master control switcher 136, the first indicative of a main or primary broadcast signal (VS1) and the second indicative of a backup broadcast signal (VS2) that is identical to the main broadcast signal should the primary server malfunction for any reason. The embodiments are not limited to these examples.

In the illustrated embodiment shown in FIG. 8, the logic flow 800 may determine which video feed to pass at block 810. For example, the master control switcher 136 may default to pass the main video feed from video server VS1. In the event that video server VS1 experiences technical difficulties, the master control switcher 136 may switch to pass the simultaneous redundant video feed coming from video server VS2. The embodiments are not limited to these examples.

In the illustrated embodiment shown in FIG. 8, the logic flow 800 may receive video feeds from the master control switcher 136 and alternate video servers at block 815. For example, the air server 138 may also receive individualized broadcast signals on behalf of each of the service providers via the implementation of individual switchers (e.g., cable switcher 139 and satellite switcher 141). The individual switchers 139, 141 each receive a main signal from the master control switcher 136. The local station may have implemented several other video servers (e.g., VS6, VS7, VS8, VS9), some associated with specific television service providers. For example, two video servers (VS6, VS7) may be associated with a cable television service provider and two video servers (VS8, VS9) may be associated with a satellite television service provider. The embodiments are not limited to these examples.

In the illustrated embodiment shown in FIG. 8, the logic flow 800 may determine which video feed to pass at block 820. For example, the cable switcher 139 may pass a split video feed from video server VS6 or a split backup video feed from video server VS7 indicative of a change in the broadcast for the cable television service provider's subscribers. The cable switcher 139 as well as additional alternative localized switchers may be able to switch among multiple video servers 137 including the video feed emanating from the master control switcher 136. The embodiments are not limited to these examples.

In the illustrated embodiment shown in FIG. 8, the logic flow 800 may forward one or more video feeds to the air server 138 at block 825. For example, the various switchers including the master control switcher 136, the cable switcher 139, and the satellite switcher 141 each forward a video feed from one of the video servers 137 to the air server 138. The embodiments are not limited to these examples.

In the illustrated embodiment shown in FIG. 8, the logic flow 800 may forward video feeds to the broadcast equipment at block 830. For example, the air server 138 may forward the main broadcast signal from video server VS1 coming from the master control switcher 136 to the OTA broadcast equipment 148 and satellite broadcast equipment 146. However, the air server 138 may forward a split signal VS6 to the cable broadcast equipment 144 based on the schedule as implemented by the TM portion of the system. The embodiments are not limited to these examples.

The methods described in the embodiments allow a local television station to selectively substitute portions of the local station television schedule with alternative programming without disrupting the main flow of programming or requiring the implementation of a second air server 138. This selective substitution may be achieved through the implementation of additional video servers and a set of switchers to control which video feed an air server 138 may supply to the broadcasting equipment of various television service providers.

Figure 9:
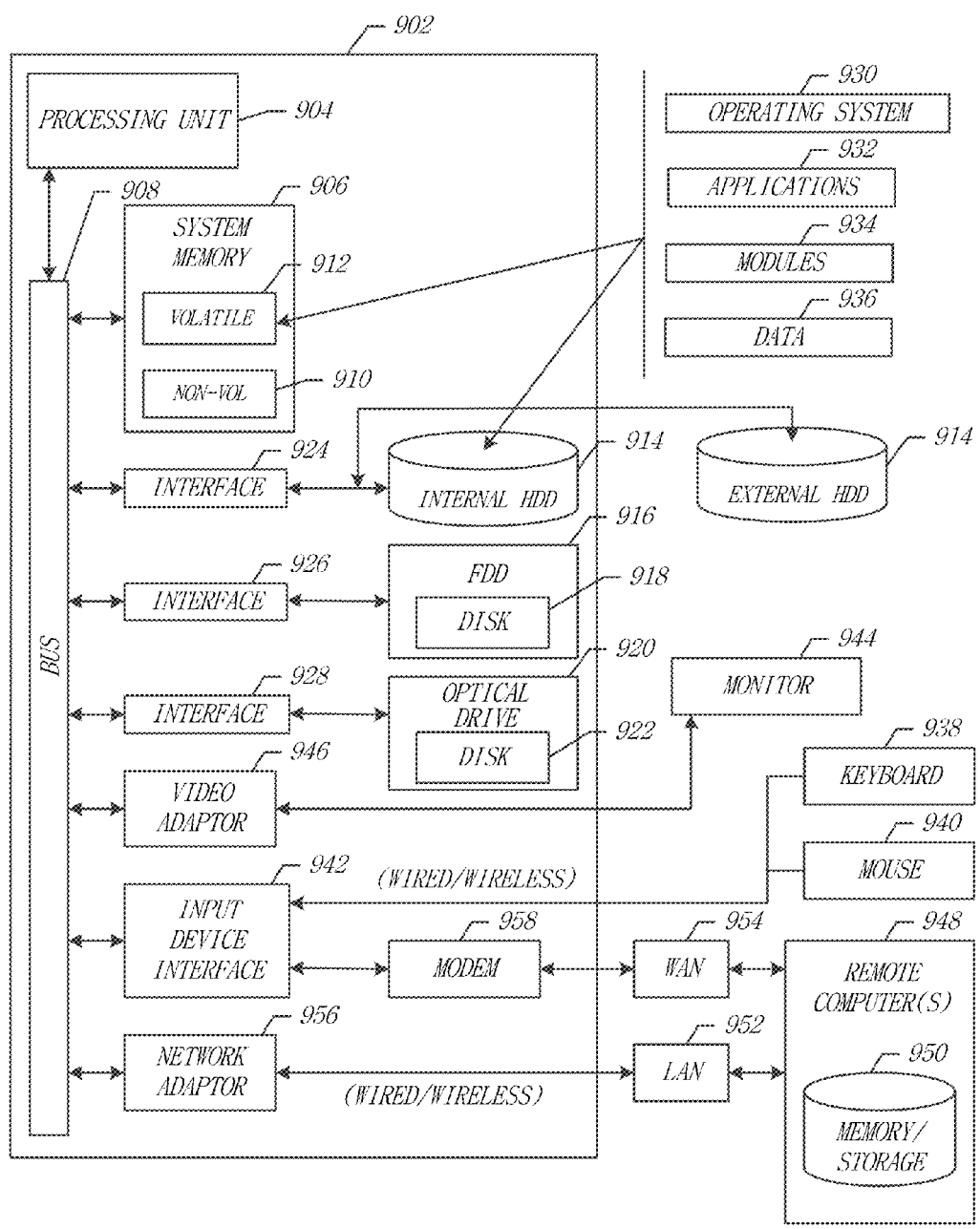
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 102 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.19 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system, comprising:
a plurality of localized switchers, each of the localized switchers associated with a different type of service provider, to receive one or more video feeds from one or more video servers, output a first one of the video feeds being output from a master control switcher and to select a spot to output according to a service provider associated with a localized switcher from the plurality of localized switchers, the selecting done from the first video feed or from a second of the video feeds being output from the one or more of the video servers that comprises a split signal including substitute spot content different from spot content in the first video feed and specific to the service provider and the associated localized switcher; and
an air server to receive video feeds from the master control switcher and the plurality of localized switchers and forward the video feeds to broadcasting equipment for a plurality of service providers, wherein the video feed from each one of the localized switchers is forwarded to broadcasting equipment for the service provider associated with each one of the localized switchers.

2. The system of claim 1, the video feeds arranged to reflect a schedule of programming for a local television station.

3. A computer-implemented method, comprising:
receiving one or more video feeds into a plurality of localized switchers, each of the localized switchers associated with a different type of service provider, from one or more video servers containing video content comprising program content and spot content, a first one of the video feeds being output from a master control switcher and a second of the video feeds being output from the one or more of the video servers that comprises a split signal including substitute spot content different from spot content in the first video feed and specific to a service provider associated with a localized switcher from the plurality of localized switchers;
selecting, by each of the plurality of localized switchers, one of the video feeds to output from the localized control switcher according to a spot in the video feed and the service provider associated with the localized switcher receiving the output;
receiving one or more video feeds into an air server to receive, the video feeds coming from the master control switcher and the plurality of localized switchers; and
forwarding the video feeds to broadcasting equipment for a plurality of service providers, wherein the video feed from each one of the localized switchers is forwarded to broadcasting equipment for the service provider associated with each one of the localized switchers.

4. The computer-implemented method of claim 3, the video feeds arranged to reflect a schedule of programming for a local television station.

5. A tangible non-transitory computer-readable storage medium comprising instructions that, when executed, cause a system comprising a plurality of localized control switchers, each of the localized control switchers associated with a different type of service provider, to:
receive one or more video feeds into each one of the plurality of localized control switchers from one or more video servers, the video feeds comprising video content comprising program content and spot content, a first one of the video feeds being output from a master control switcher and a second of the video feeds being output from one or more of the video servers that comprises a split signal including substitute spot content different from spot content in the first video feed and specific to the service provider associated with the each one of the localized control switchers;
select one of the video feeds to output from each localized control switcher according to a spot in the video feed and a service provider associated with the localized control switcher receiving the output;
receive one or more video feeds into an air server, the video feeds coming from the master control switcher and the plurality of localized control switchers; and
forward the video feeds from the air server to separate broadcasting equipment for a plurality of different types of service providers, wherein the video feed from each one of the localized switchers is forwarded to broadcasting equipment for the service provider associated with each one of the localized switchers.

6. The tangible non-transitory computer-readable storage medium of claim 5, the localized switcher associated with a television service provider.

7. The tangible non-transitory computer-readable storage medium of claim 6, the television service provider comprising one of a cable television service provider, a satellite television service provider, an over-the-air (OTA) television service provider, and a television over telephone line television service provider.

8. The tangible non-transitory computer-readable storage medium of claim 7, the broadcasting equipment associated with a television service provider.

9. The tangible non-transitory computer-readable storage medium of claim 5, the program content comprising content associated with a program.

10. The tangible non-transitory computer-readable storage medium of claim 9, the program comprising one of a scripted television show, an unscripted television show, a sporting event, a newscast, and a movie.

11. The tangible non-transitory computer-readable storage medium of claim 5, the spot content comprising content associated with a spot.

12. The tangible non-transitory computer-readable storage medium of claim 11, the spot comprising one of an advertisement, network promotion, and public service announcement.

13. The system of claim 1, further comprising:
a traffic master (TM) server executing, one or more software applications operative to:
receive schedule data indicative of programming to air on a local television station; and
edit the schedule data to create an air-able schedule; and
an inventory management server (IMS) server executing one or more software applications operative to:
locate video content associated with the programming, the video content comprising program content and spot content;
convert the video content to a specific format; and
load the converted video content into the one or more video servers.

14. The computer implemented method of claim 3, further comprising:
receiving schedule data indicative of programming to air on a local television station;
editing the schedule data to create an air-able schedule;
locating video content associated with the programming;
converting the video content to a specific format; and
loading the converted video content into the one or more video servers.

15. The tangible non-transitory computer-readable storage medium of claim 5, further comprising instructions that, when executed, cause the system to:
receive schedule data indicative of programming to air on a local television station;
edit the schedule data to create an air-able schedule;
locate video content associated with the programming;
convert the video content to a specific format;
load the converted video content into one or more video servers;
receive one or more video feeds into the master control switcher from the one or more video servers containing the converted video content; and
select one of the video feeds to output from the master control switcher.

* * * * *